No. 744,699. PATENTED NOV. 17, 1903.
T. S. WARNER.
LISTER CULTIVATOR.
APPLICATION FILED FEB. 2, 1903.
NO MODEL. 3 SHEETS—SHEET 2.
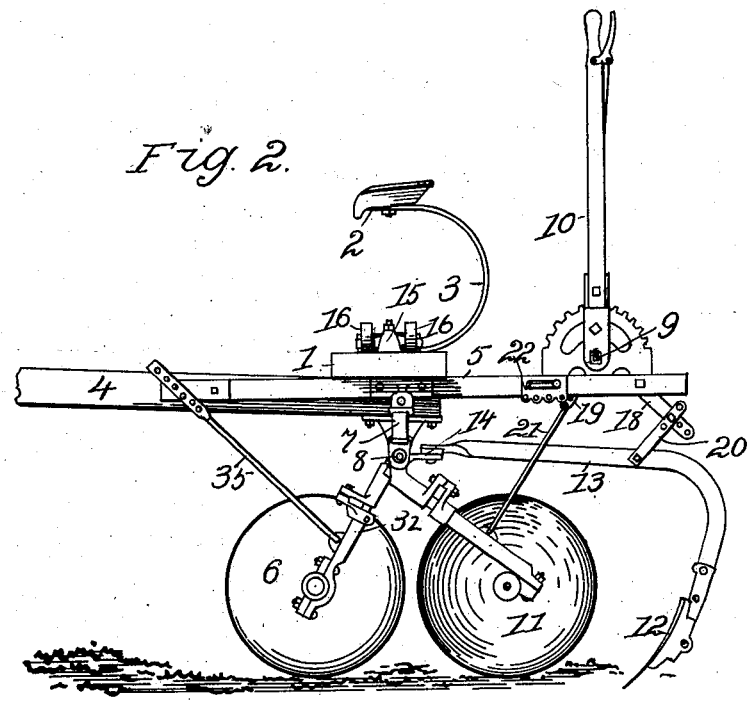
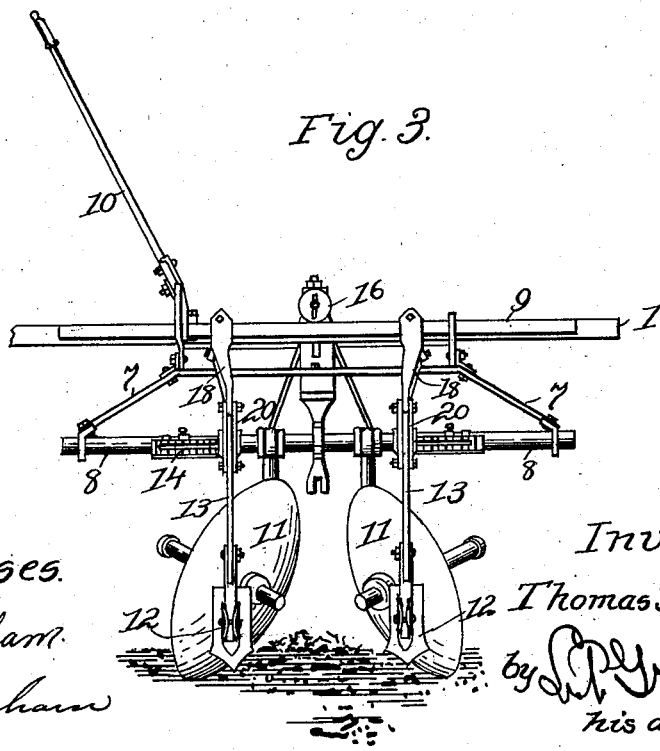
Witnesses.
Ina Graham.
Nora Graham
Inventor.
Thomas S. Warner.
by S. P. Graham
his attorney.

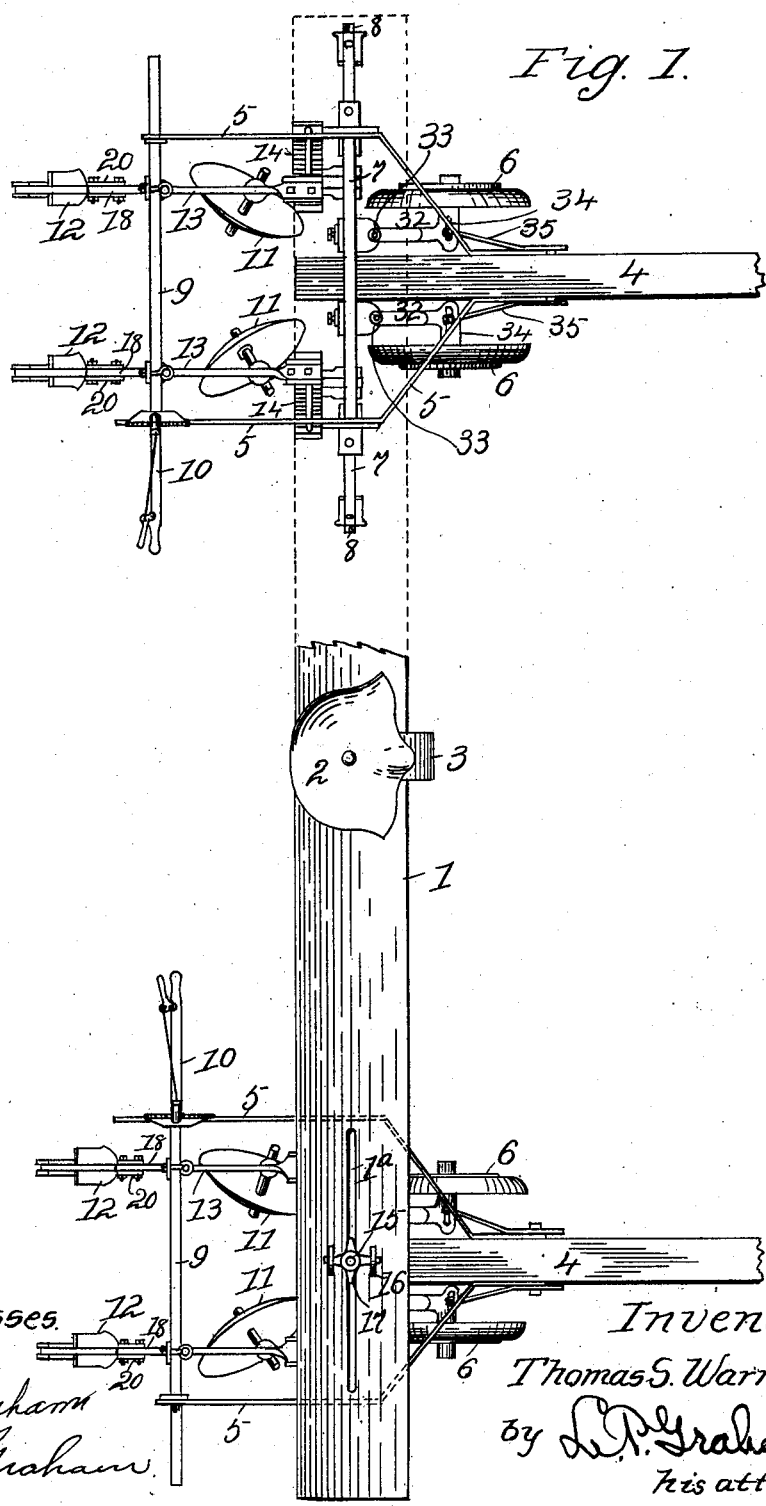

No. 744,699. PATENTED NOV. 17, 1903.
T. S. WARNER.
LISTER CULTIVATOR.
APPLICATION FILED FEB. 2, 1903.
NO MODEL. 3 SHEETS—SHEET 3.
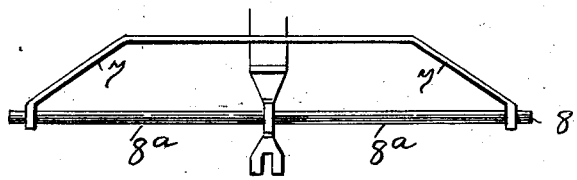
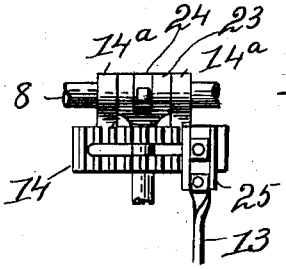
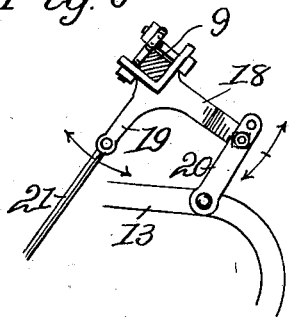
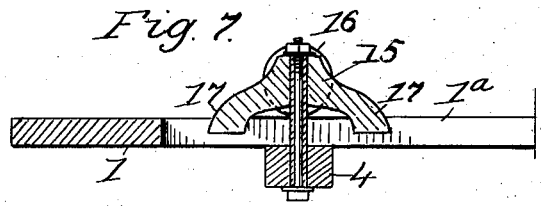
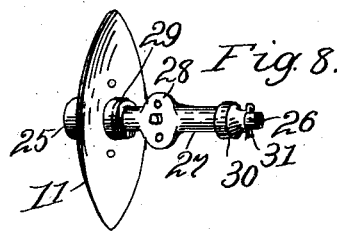
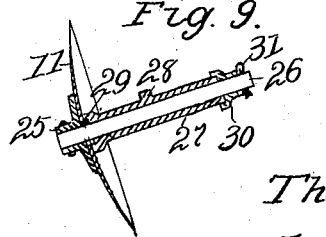
Witnesses.
Ina Graham.
Nora Graham.
Inventor.
Thomas S. Warner.
by M. P. Graham
his attorney.

No. 744,699.

Patented November 17, 1903.

UNITED STATES PATENT OFFICE.

THOMAS S. WARNER, OF FRANKFORT, KANSAS, ASSIGNOR TO SATTLEY MANUFACTURING COMPANY, OF SPRINGFIELD, ILLINOIS, A CORPORATION OF ILLINOIS.

LISTER-CULTIVATOR.

SPECIFICATION forming part of Letters Patent No. 744,699, dated November 17, 1903.

Application filed February 2, 1903. Serial No. 141,570. (No model.)

*To all whom it may concern:*

Be it known that I, THOMAS S. WARNER, of Frankfort, in the county of Marshall and State of Kansas, have invented certain new and useful Improvements in Lister-Cultivators, of which the following is a specification.

One object of this invention is to provide means whereby the disks and the shovels of a lister-cultivator may be raised from and lowered to an operative position by the manipulation of a hand-lever, and the depth of penetration of the shovels may be varied through the lever without materially affecting the depth of cut of the disks.

Another object is to provide raising and lowering mechanism for the disks and shovels which will act on the disk-beams and shovel-beams at points in the rear of the hitch-pivots of the beams and independent of the pivots.

Another object is to provide means for adjusting the cultivating appliances sidewise from one extreme to the other without detaching them from the draft bar or frame.

Another object is to provide a roller-bearing for the connecting-plank of a two-row cultivator which will swing with the plank and hold the axes of the rollers crosswise of the plank.

Another object is to provide a disk-journal and bearing therefor which is particularly applicable to the disks of lister-cultivators.

Another object is to provide means for giving the wheels "gather," which is obtained by bringing the fronts of the wheels closer together than the rear parts and which is used to enable the cultivator to follow poorly-defined furrows.

The invention is exemplified in the structure hereinafter described, and it is defined in the appended claims.

In the drawings forming part of this specification, Figure 1 is a plan of a two-row lister-cultivator embodying my improvements, one end of the connecting-plank being broken away to better expose details of construction of one of the cultivators. Fig. 2 is a side elevation of the cultivator. Fig. 3 is a rear elevation showing the parts that appear most conspicuously from that point of view. Fig. 4 is a rear elevation of a detail, illustrating the means employed to enable sidewise adjustment of the cultivating appliances from one extreme to the other without detachment from the frame. Fig. 5 is a plan detail of the hitch used to connect the cultivating appliances to a cross-bar of the frame in a manner permitting sidewise adjustment thereon. Fig. 6 is a detail in side elevation of the means used to raise and lower the cultivating appliances. Fig. 7 is a longitudinal vertical section through an end of the connecting-plank, showing the roller-bearing used to facilitate the shift of the plank on the cultivator-frame. Fig. 8 is a detail in plan of the bearing for the disk-journal. Fig. 9 is a longitudinal vertical section through the bearing for the disk-journal.

The connecting-plank is shown at 1, a seat thereon at 2, and a support for the seat at 3. The tongues of the cultivator are shown at 4, the frames at 5, and the supporting-wheels at 6. A truss-bar 7 is secured to each of the cultivator-frames, crosswise thereof, and the downward-projecting ends of the truss-bar connect with the ends of a hitch bar or shaft for the cultivating appliances. The hitch-shaft 8 is circular in cross-section, and it provides elongated and unobstructed surfaces on which the cultivating appliances may be adjusted sidewise from one extreme to another. A shaft 9 is journaled in the rear end of each cultivator-frame, crosswise thereof, and a hand-lever 10 provides means for rocking the shaft in its bearings and for locking it in any desired position. The cultivating-disks are shown at 11, the shovels at 12, and the beams for the shovels at 13. Hitch-brackets for the cultivator are shown at 14.

The connecting-plank 1 is slotted lengthwise vertically at one end, as shown at 1ª in Fig. 1 and Fig. 7, a bolt extends from the cultivator-frame upward through the slot, a bracket or casting 15 journals on the bolt, arms 17 extend sidewise from the casting and enter the slot of the plank, while wheels or rollers 16 journal on pivots extending at right angles to the arms 17 and bear against the upper surface of the plank. The two cultivators follow each an independent furrow, the space between the furrows varies somewhat, and one cultivator at times travels a little in advance or a little in the rear of the other. The slot 1ᵃ permits the cultivators to travel toward and from each other to a limited extent and to vary slightly in their speed of travel. As the connecting-plank swings on the frame of the cultivator in accommodating itself to the varying conditions above mentioned the rollers 16 are held parallel with the sides of the plank by the arms 17, engaging the slot 1ᵃ, and motion of the plank on the cultivator-frame is facilitated by the rolling friction developed by the rollers. The cultivator-frames tend to tilt from the horizontal to follow the furrows, and the connecting-plank resists this tendency by pressing downward on one of the side bars of the cultivator-frame and upward against the rollers 16.

The hitch-bar 8 has two long unobstructed surfaces, as shown at 8ᵃ in Fig. 4, to any part of which the cultivating appliances may be connected and along which the cultivating appliances may be adjusted. The unobstructed parts of the shaft 8 are each long enough to permit the cultivating appliances to be placed as close to the corn-rows as is needed for first plowing and as far from the rows as subsequent cultivation may require, and the changes may be made without disconnecting the cultivating appliances from the shaft. The means preferably employed to connect the cultivating appliances to the shaft 8 comprises a bracket 14, provided with lugs 14ᵃ. The lugs are separated. In the space between the lugs the forked end 23 of a disk-beam journals on the shaft, and a collar 24 is secured on the shaft in the crotch of the forked end of the disk-beam. A block 25 is adjustable lengthwise of bracket 14, which is sidewise of the cultivator, and a beam 13 of a shovel 12 is adjustably secured to the bracket 14 through the block 25 and a securing-bolt. The bracket is slotted lengthwise and corrugated on its face to facilitate adjustment and make the connections secure. The shovel-beam may be adjusted on the bracket to vary its relation to the disk, and both disk and shovel may be adjusted with relation to the row by shifting collar 24 along shaft 8. The collar is provided with a set-screw by means of which it is secured in any desired position on the shaft.

The shaft 9 has an arm 18 for each shovel-beam and an arm 19 for each disk-beam. Stiff links 20 connect arms 18 with the shovel-beams, and stiff links 21 connect arms 19 with the disk-beams. When the disks are in operative positions, the arms 19 line up with links 21, as shown in Figs. 2 and 6, and the arms 18 extend rearward and form approximately right angles with links 21. Under these conditions a slight rock of shaft 9 will cause the shovel to penetrate the soil more or less deeply without affecting the depth of the disks.

The disks are used largely for the purpose of cutting weeds off the sides of the furrows, while the shovels are used to pulverize the soil and cut away the ridges that the disks tend to develop. This necessitates a rather shallow cut of uniform depth on the part of the disks, while the cut of the shovels varies under different conditions of soil. The peculiar arrangement of the arms connecting the rock-shaft 9 with the disk-beams and the shovel-beams has reference to the fact that the disks run at approximately even depth, while the shovels penetrate the soil at varying depths.

The rock-shaft 9 is journaled in the cultivator-frame well to the rear of the hitch-pivots of the cultivating appliances, and the links 20 and 21 act nearly in line with the resistance of the soil to the penetration thereof by the shovels and the disks. In other words, force is applied directly to the shovels independent of the pivot-hitch instead of through the pivot-shaft, as is usually done. The direct application of force is preferable on general mechanical principles, and it permits the various parts contributing to the control of the cultivating appliances to be made quite light without becoming detrimentally weak.

The standards 32 for the supporting-wheels 6 are pivoted at 33 to swing horizontally, and they extend forward from their pivots to the wheels. Slots 34 are formed in the forward extensions of the standards 32, and braces 35 connect with the tongue and extend rearward to the slots 34. Under ordinary circumstances the supporting-wheels are made to run parallel with each other and with the tongue; but wherever the furrows are not ordinarily deep and well defined the wheels may be set with their front parts nearer together and with both inclined equally toward the corn-row. Then when a cultivator tends to run to one side of the furrow one of the wheels will take the weight of the cultivator and by its inclined tread will carry the cultivator to the center of the furrow. The cultivator-frames are held in horizontal positions by the connecting-plank and neither can tilt to permit one of the carrying-wheels to run lower than the other. This throws the entire weight of the cultivator on the highest wheel. The highest wheel is the one farthest from the corn-row, and the inclination of such wheel is toward the corn-row.

The disks 11 of the cultivator have caps 25 on their convex sides, and a journal shaft or spindle 26 is secured at one end in each cap 25 and extended through the disk beyond the concave surface thereof. A sleeve 27 fits over the spindle-shaft. It has a flat surface 28 with which the disk-beam connects, and it is enlarged at 29 to fit over an extension of cap 25. A cap 30 acts as a washer and as a protector for the outer end of sleeve 27, as it fits over the end of the spindle and also covers the end of the sleeve. A pin 31 passes through the spindle outside the cap 30 and holds the cap and sleeve in place on the spindle. The disk runs with its concave face presented obliquely upward and the spindle is inclined upward from the disk. The spindle is protected against the intrusion of dirt by the enlarged overlapping part 29 of the sleeve and by the cap 30. The spindle turns in the sleeve, and thus wears uniformly around its entire circumference, while the sleeve tends to wear at certain points on account of its relatively fixed condition. This is a matter of economy, inasmuch as the cast-metal sleeve may be more cheaply and readily replaced than the steel spindle.

To enable the disks to be run continually without raising or lowering them, I place brackets, as 22 in Fig. 2, on the bars 5 of the cultivator-frames and connect links 21 with the brackets instead of with arms 19. The brackets 22 have each a plurality of holes by means of which the disks may be set to cut at various depths.

I claim—

1. In a lister-cultivator, the combination of a cross-shaft sustained at its ends and unobstructed between its ends, a bracket shiftable lengthwise of the cross-shaft, a disk-beam connected with the cross-shaft and shiftable with the bracket and a shovel-beam secured to the bracket by a connection shiftable on the bracket lengthwise of the shaft.

2. In a lister-cultivator, the combination of a cross-shaft sustained at its ends and unobstructed between its ends and its center, a bracket pivotally connected with the cross-shaft by separated lugs, a forked end of a disk-beam pivoted on the shaft between the lugs of the bracket, a shovel-beam secured to the bracket, and a collar fastened onto the shaft in the crotch of the fork of the disk-beam.

3. In a lister-cultivator, the combination of a cross-shaft, cultivating appliances pivotally hitched to the cross-shaft, a rock-shaft in the rear of the cross-shaft, a lock-lever for manipulating the rock-shaft, arms on the rock-shaft and links connecting the arms with the cultivating appliances in rear of the hitch pivots thereof.

4. In a lister-cultivator, the combination of a cross-shaft, a shovel-beam and a disk-beam pivotally hitched to the cross-shaft, a rock-shaft in the rear of the cross-shaft, means for rocking the rock-shaft, an arm on the rock-shaft extending toward the disk-beam when the disk is lowered and connecting with the beam by means of a strut-link, another arm on the rock-shaft extending above the shovel-beam when the shovel is in operative position, and a strut-link connecting the second arm with the shovel-beam, as and for the purpose set forth.

5. In a two-row lister-cultivator, the combination of a pair of cultivators, a connecting-plank for the cultivators having a longitudinal vertical slot at one end, a bolt extending from the cultivator-frame through the slot, a bracket pivoted on the bolt above the plank, arms on the bracket entering the slot of the plank and rollers on extensions of the bracket running parallel with the slot of the plank.

6. In a lister-cultivator, the combination of a cultivating-disk, a cap attached to the convex side of the disk and having a ring portion extending through the disk beyond the concave surface thereof, a journal-spindle secured in the cap to rotate with the disk and projecting from the concave side of the disk, a sleeve fitting onto the spindle against the concave face of the disk, and around the ring projection of the cap, a washer-cap fitting onto the spindle and over the outer end of the sleeve and a draft-beam attached to the sleeve.

In testimony whereof I sign my name in the presence of two subscribing witnesses.

THOMAS S. WARNER.

Witnesses:
  J. A. KAVANAUGH,
  F. B. HENNEY.